July 17, 1956  J. F. COX  2,755,024
CRIBBAGE BOARD

Filed Aug. 16, 1952  2 Sheets-Sheet 1

INVENTOR.
JOHN F. COX
BY
Barlow & Barlow
ATTORNEYS

July 17, 1956  J. F. COX  2,755,024
CRIBBAGE BOARD
Filed Aug. 16, 1952  2 Sheets-Sheet 2
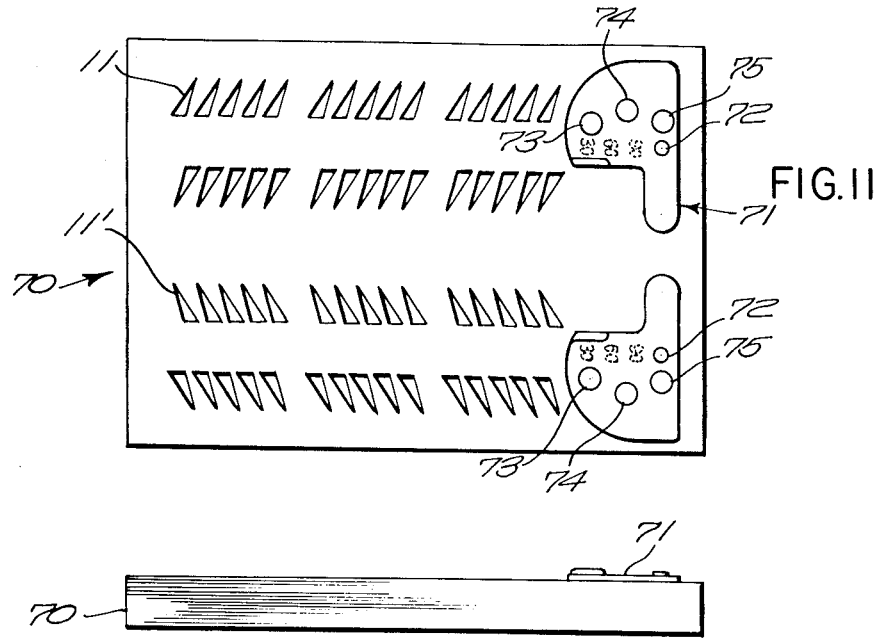
FIG. 11
FIG. 12
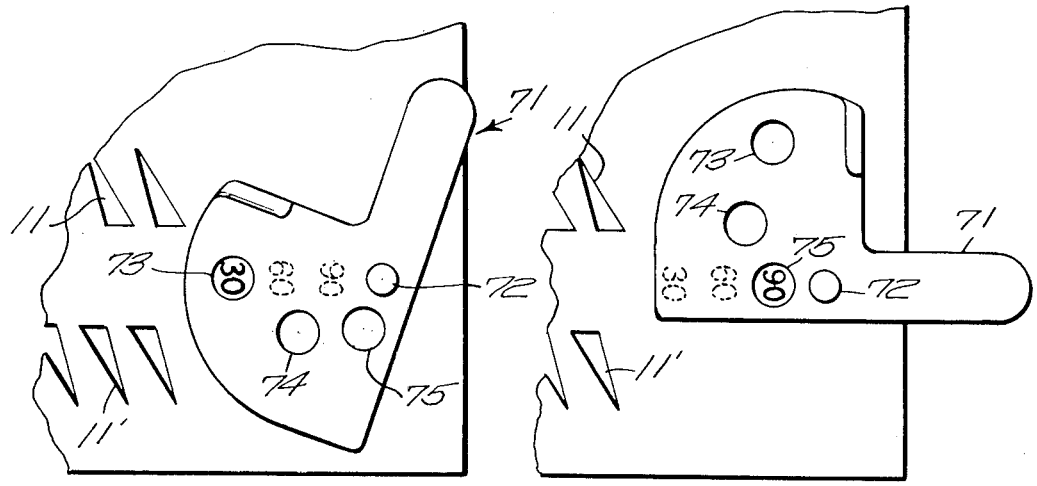
FIG. 13  FIG. 14
INVENTOR.
JOHN F. COX
BY
*Barlow & Barlow*
ATTORNEYS

United States Patent Office 2,755,024
Patented July 17, 1956

2,755,024
CRIBBAGE BOARD
John F. Cox, Fall River, Mass.

Application August 16, 1952, Serial No. 304,696

3 Claims. (Cl. 235—90)

This invention relates to scoring devices employing movable indicators and more particularly to a cribbage board.

Conventional cribbage boards usually employ round holes and round pegs. However, when it is desired to reduce the size of the board to vest pocket size, there naturally results a crowding of the holes and with the holes in close spaced relationship, it becomes difficult to move the pegs should they be inserted in adjacent holes.

It is an object of my invention to provide pegs half of which have handle portions or are angularly offset relative to the surface of the board so that they may be easily grasped when they are adjacent a straight pin.

It is a further object of my invention to provide holes of an elongated slot shape so that the pegs will be inserted to hold the handle portion in the same position after each move.

It is a further object of my invention to cut the handle portion of the peg in a shape to indicate the direction of movement.

It is also an object of my invention to shape the elongated slots to indicate the direction of play.

It is a still further object of my invention to provide a recess in the board for storing the pegs when they are not in use.

A still further object of my invention is to provide a retaining means for holding the pegs in a recess and utilizing this retaining means for indicating when a player has completed moves totaling two rows.

With these and other objects in view, the invention consists of certain novel features of construction as will be more fully described and particularly pointed out in the appended claims.

In the accompanying drawings:

Figure 11 is a plan view of a cribbage board of a modified form;

Figure 12 is a side edge view of the cribbage board shown in Figure 11;

Figure 13 is a plan view on an enlarged scale of the lower right hand corner portion of the cribbage board shown in Figure 11; and Figure 14 is a similar view showing the parts in a different relation.

Figure 3:
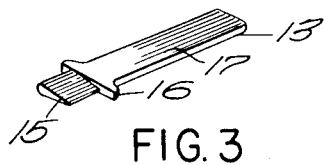
Figures 3 and 4 are perspective views of the pegs used with the cribbage board of Figures 1 and 2.
Figure 4:
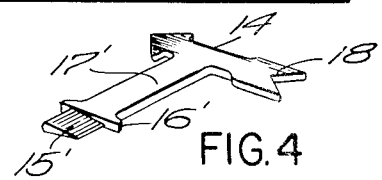
Figure 5:
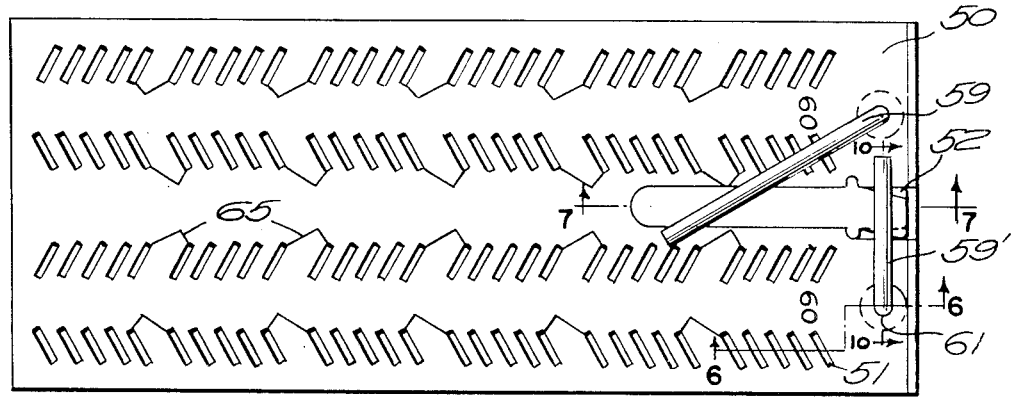
Figure 5 is a plan view of a cribbage board of another form of my invention.

Referring to the embodiment shown in Figures 1–4, 10 designates the board which is preferably, although not necessarily, made of a resin or some plastic type material and which is provided with triangularly shaped slots 11, 11'. Referring more particularly to Figures 3 and 4, the pegs 13 and 14 are provided with a body portion 15, 15' of a corresponding triangular shape and size to be accepted into the slots 11, 11' and shoulders 16, 16' to limit the movement of the pegs into the slots. The pegs 13 are provided with a straight handle portion 17, while the pegs 14 have a straight handle portion 17' surmounted by an arrow indicating means and handle extension 18. The holes 11, 11' in the board are arranged to accept the pegs 13 and 14 in one position only. When the peg 14 is inserted into the hole 11, it will be noted that the arrow 18 will be pointing generally in the direction of movement of the peg in play. When thirty points have been tallied, the peg 14 will be inserted into the hole 11' and in this position the arrow 18 will generally point in the opposite direction of movement in scoring the play. Should the pegs 13 and 14 be placed in adjacent slots, it will be noted that the handle portion 17', 18 of the peg 14 will serve to easily grasp the peg to move it to another hole.

The board has at one end thereof a recess 12 which is cut into a shape to accept the pegs 13 and 14. To retain the pegs in the recess 12, I have provided two arms 20 and 20' which have finger pieces 21, 21' and are journaled into the board 10 as at 22, 22'. To limit the movement of these arms, I provide a shoulder abutment 23, 23' which will allow the arms 20, 20' to be swung between the position as illustrated and that shown in dotted lines as at 24. Below the arms 20, 20' I may provide an indicium number 60 which would be normally covered up by the arms 20, 20'. However, when the count of the game has advanced beyond the number 60, the arm 20 or 20' could be swung so as to uncover the indicium number 60 and thus indicate that the count had proceeded beyond sixty and in the second series of sixty.

Figure 7:
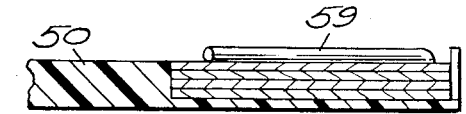
Figure 7 is a sectional view taken on lines 7—7 of Figure 5 with the arm shown in full and the other omitted for clarity.
Figure 6:
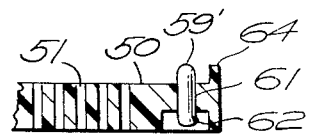
Figure 6 is a sectional view of the cribbage board of Figure 5 taken on lines 6—6 of Figure 5.
Figure 8:
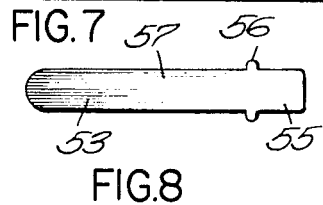
Figures 8 and 9 are plan views of the pegs used with the cribbage board of Figure 5.
Figure 9:
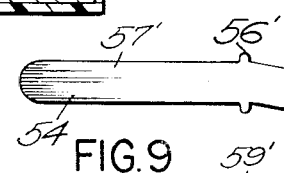
Figure 10:
Figure 10 is a sectional view of a fragmental portion of the cribbage board of Figure 5 taken along lines 10—10 of Figure 5.

Referring now to Figures 5–10, I show an alternate form of my invention wherein the cribbage board 50 is provided with rectangular slots 51 and a recess 52 which is adapted to store the pegs 53 and 54. Each of the pegs 53 and 54 is provided with a body portion 55, 55', a shoulder portion 56, 56', and a handle portion 57, 57'. The body portion 55' and handle portion 57' of the peg 54 are disposed at an angle to each other at the shoulder portion 56'. Thus, should the pegs 53 and 54 be inserted in adjacent slots in the board, the handle portion 57' will extend at an angle to the surface of the board 50 and facilitate grasping the pegs. In this embodiment I provide retaining arms 59, 59' which are journaled in holes 61 and are retained by a portion 62 bent or offset to prevent passage through hole 61. To generally indicate the direction of play, the slots 51 are disposed at an acute angle to the longitudinal edge of the board and there are provided engraved indicia 65 which generally act as an extension of the angularly related slots. As in the former embodiment arms 59, 59' serve a dual function, that of holding the pegs 53, 54 stored in the recess as shown in Figure 7, and further to indicate when two counting rows have been traversed by moving the arms 59, 59' away from the indicia on the surface of the board. A shoulder abutment 64 on the board limits the movement of the arms 59, 59'.

Figure 1:
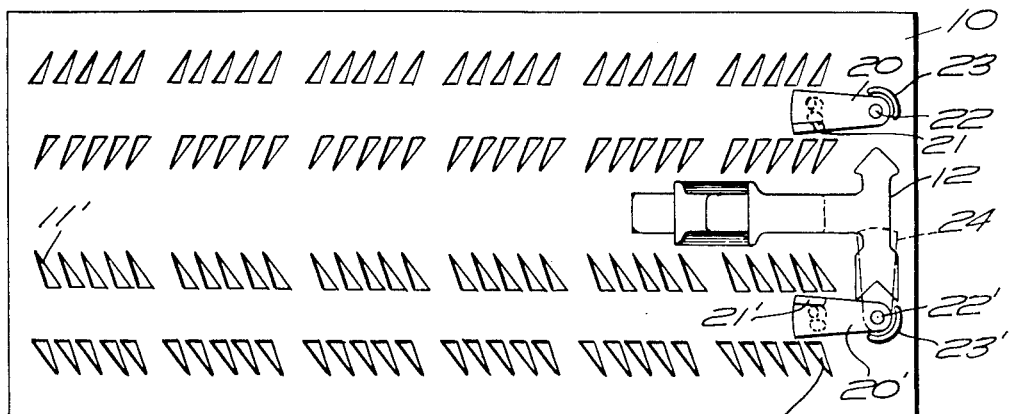
Figure 1 is a plan view of a cribbage board of one form of my invention.
Figure 2:
Figure 2 is a side view of the cribbage board of Figure 1 with a broken section showing the slots extending through the board.

In Figure 11 I have shown an alternate form of cribbage board 70 in which the holes 11—11 are of similar shape to those shown in Figure 1 but of a lesser number thereof in each set, thirty holes being shown for each set. In order to indicate the number of rounds of the pegging of the holes at any instance of the scoring, three indicia numbers 30, 60, and 90 are provided at one end portion of the cribbage board 70. A member 71 is provided for each set of openings 11 and is pivotally mounted on the said end portion as at 72 to sweep over the said indicia numbers 30, 60 and 90. This member is provided with openings 73, 74, and 75 therethrough which may be moved one after another into register with the indicia 30, 60, and 90. At the start of the count the member 71 is swung to cover all of the said numbers 30, 60, and 90. Upon one round of holes 11 having been pegged, the member 71 is swung to register the opening 73 thereof with the indicium 30 which will indicate one round of pegging of the holes 11 (see Figure 13). Upon the second round of pegging of the holes 11, the member 71 is swung to register the opening 74 thereof with the indicium 60 which will indicate a second round of pegging and at the third round of pegging the arm will be swung as shown in Figure 14 to register the opening 75 thereof with the indicium 90 which will indicate a third round of pegging of said holes 11.

I claim:

1. A cribbage board having rectangular counting slots disposed therein, the major axis of each of said slots being arranged at an acute angle to the longitudinal edges of said board to generally indicate the direction of play, a plurality of pegs of rectangular cross section for insertion in said slots having shoulders adjacent one end thereof.

2. A cribbage board having parallel rows of slots and a pair of pegs for insertion therein, said pegs and slots being elongated in cross section, the major axis of each of said slots being arranged at an acute angle to the edges of said board, said pegs each having a shoulder at one end portion thereof, one of said pegs having a portion thereof at one side of said shoulder disposed in the plane of the portion on the other side of the shoulder and at an angle thereto.

3. A cribbage board as in claim 2 wherein said slots are elongated triangular in cross section.

References Cited in the file of this patent

UNITED STATES PATENTS

| | | |
|---|---|---|
| 918,207 | Shimer | Apr. 13, 1909 |
| 1,039,485 | Biggar | Sept. 24, 1912 |
| 1,394,715 | Culver | Oct. 25, 1921 |
| 1,405,063 | Murray | Jan. 31, 1922 |
| 1,789,890 | Agrell | Jan. 20, 1931 |
| 1,843,457 | Morse | Feb. 2, 1932 |

FOREIGN PATENTS

| | | |
|---|---|---|
| 367,956 | Great Britain | Mar. 3, 1932 |
| 622,399 | Great Britain | May 2, 1949 |